United States Patent [19]

Bearden et al.

[11] Patent Number: 5,357,237
[45] Date of Patent: Oct. 18, 1994

[54] IN A DATA PROCESSOR A METHOD AND APPARATUS FOR PERFORMING A FLOATING-POINT COMPARISON OPERATION

[75] Inventors: David R. Bearden; Raymond L. Vargas; Elie I. Haddad, all of Austin, Tex.

[73] Assignee: Motorola, Inc., Schaumburg, Ill.

[21] Appl. No.: 941,011

[22] Filed: Sep. 4, 1992

[51] Int. Cl.[5] .......................... G06F 7/012; H03K 5/22
[52] U.S. Cl. .................................. 340/146.2; 307/355; 364/748; 364/769
[58] Field of Search ...................... 340/146.2; 307/355; 364/748, 769

[56] References Cited

U.S. PATENT DOCUMENTS

| | | | |
|---|---|---|---|
| 4,683,546 | 7/1987 | Boney | 340/146.2 |
| 4,857,882 | 8/1989 | Wagner et al. | 340/146.2 |
| 4,858,166 | 8/1989 | Schatzberter et al. | 364/748 |
| 4,918,636 | 4/1990 | Iwata et al. | 340/146.2 |
| 5,086,405 | 2/1992 | Chung et al. | 364/748 |

OTHER PUBLICATIONS

Mark Birman, "Developing the WTL3170/3171 Sparc Floating-Point Coprocessors", IEEE MICRO Feb. 1990, pp. 55–64.

Chris Rowen, et al., "The MIPS R3010 Floating-Point Coprocessor," IEEE MICRO Jun. 1988, pp. 53–62.
Les Kohn, et al., "Introducing the Intel i860 64-Bit Microprocessor," IEEE MICRO Aug. 1989, pp. 15–30.

Primary Examiner—Margaret Rose Wambach
Attorney, Agent, or Firm—Charlotte B. Whitaker

[57] ABSTRACT

A data processor (10) has a floating-point execution unit (32) for executing a floating-point compare operation using two data operands. The execution unit (32) uses mantissa comparator logic (107) to perform a bit-wise comparison of a mantissa portion of a first operand with the mantissa portion of a second operand, and to provide a mantissa comparison result. Similarly, exponent comparator logic (122) performs a bit-wise comparison of an exponent portion of the first operand with the exponent portion of the second, and provides an exponent comparison result. Comparator logic (114) in the execution unit receives the mantissa comparison result and the exponent comparison result. If the exponent portions of the two operands are not equal, the comparator logic (114) uses an operand sign bit of each operand and the exponent comparison result to order the two operands. If the exponent portions of the two operands are equal, the comparator logic uses the operand sign bit of each operand and the mantissa comparison result to order the two operands.

12 Claims, 10 Drawing Sheets

IN A DATA PROCESSOR A METHOD AND APPARATUS FOR PERFORMING A FLOATING-POINT COMPARISON OPERATION

FIELD OF THE INVENTION

This invention relates generally to data processors and specifically to data processors which perform floating point operations.

BACKGROUND OF THE INVENTION

State of the art microprocessor designs continue to integrate operation-specific execution units (e.g. pixel-processing units, floating-point dividers and multipliers) on a single chip. Since these operation-specific execution units are tuned to perform specific tasks, their use typically improves a microprocessor's overall performance. The drive for higher performance is especially evident in floating point computations, and typically, superior floating-point performance is key to microprocessor competitiveness. Among the problems associated with floating point computations is improving the performance of a floating point comparison operation, while simultaneously minimizing the logic circuitry required to implement floating-point instructions (e.g. floating-point add and subtract) in an execution unit.

A floating point comparison operation establishes the ordering of two numbers. Traditionally, floating-point comparison operations have been implemented along with floating-point add and subtract operations. It is not necessary, however, that floating-point comparison operations be performed in the execution unit where the addition and subtraction is performed. Traditional implementations perform a comparison of two floating point numbers (A and B) by first subtracting the exponents of the two floating point numbers to be compared. Using exponent flags, the execution unit then determines which floating-point number (A or B) has the larger exponent. Based upon such determination, the execution unit then decides to align either floating-point A or floating-point B so that the exponents are equal. The floating-point execution unit aligns the floating-point number with the smaller exponent by performing a right shift by a number of bit positions equivalent in magnitude to the exponent difference. Subsequent thereto, the floating-point execution unit executes a subtraction of the mantissas to determine which, if either, of the floating-point numbers is larger. Generally, in the first technique, additional logic is required to determine equivalency between the exponents and the mantissas. Such additional logic determines a zero result from the exponent and mantissa subtraction operations. Accordingly, the microprocessor generates a comparison result, which may be in the form of a set of conditions codes, or as a true/false response to a set of predicates.

In the first technique, the floating-point comparison result is essentially a floating-point subtraction operation, and essentially, the floating-point comparison is performed using the same hardware employed to perform other floating-point operations (e.g. subtraction). Consequently, the generation of the floating-point comparison result, may take a significant amount of time or cycles depending upon the floating-point execution unit's structure. The floating-point comparison operation has a latency equal in clock cycles to the latency of the floating-point operations. Thus, a disadvantage of the first technique is that the floating-point comparison may be slower than necessary since performance of the comparison operation is tied to the execution unit's structure and/or partitioning.

In U.S. Pat. No. 4,858,166, a second technique for generating a floating-point comparison result is disclosed. In the '166 patent, the execution unit subtracts the exponents of the two floating point numbers (A and B) to be compared. The execution unit then determines if the result of the subtraction is zero. If the result is not zero, the execution unit compares the signs of the mantissas and the result of the comparison of the exponents to determine which floating-point number A or B is greater. If the result of the exponent comparison is zero, then the exponents of the floating point numbers A and B are equal. The execution unit then determines if the signs of A and B are equal. If so, then the execution unit performs a subtraction of the mantissas to determine the larger of the numbers A or B. If the signs are not equal, then the positive number (A or B) is the larger.

Accordingly, the '166 patent discloses a floating-point comparison method which uses exponent subtraction and a resulting difference signal (overflow signal from the exponent subtraction), exponents-equal detection, mantissa subtraction and the resulting difference signal, and mantissas-equal detection to order two floating-point numbers. The advantages of the second technique over the first is the faster execution time gained by immediately performing the mantissa subtraction along with the exponent subtraction, with no alignment being performed on the mantissas themselves. Essentially, if the exponents are different, the result of the mantissa subtraction is meaningless, and only the exponents and the sign bits are required to order the numbers. If the exponents happen to be the same, then no alignment of the manassas is necessary, and the mantissa subtraction result along with the sign bits determine the ordering of the two numbers.

Accordingly, the second technique attempts to speed-up the comparison execution time by bypassing the alignment step. A disadvantage of the second technique is the inherent requirement that the comparison operation share certain logic (e.g. exponent subtracter and mantissa subtracter) in the floating-point execution unit. Consequently, the exertion time of the floating-point comparison operation is still dependent upon a partitioning or structure which does not facilitate maximum performance. Thus, attempts to speed-up the execution time of a floating-point comparison would require duplication of large sections of logic (such as the mantissa subtracker).

Thus, it is desirable to provide a method for performing a floating-point comparison which maximizes performance, while minimizing the necessary logic required for implementation of the method.

SUMMARY OF THE INVENTION

A method and apparatus for performing a floating-point compare operation in a data processor is provided. The data processor includes a floating-point execution unit for executing floating-point operations using a plurality of floating-point operands. Each floating-point operand includes an exponent portion and a mantissa portion. Mantissa comparator logic in the execution unit performs a bit-wise comparison of the mantissa portion of a first data operand with the mantissa portion of a second data operand, to determine whether the mantissa portion of the first is greater than, less than, or equal to the mantissa portion of the second, and provides a mantissa comparison result. Exponent comparator logic in the execution unit performs a bit-wise comparison of the exponent portion of the first data operand with the exponent portion of the second data operand to determine whether the exponent portion of the first is greater than, less than, or equal to the exponent portion of the second, and provides an exponent comparison result.

Comparator control logic in the execution unit receives the mantissa comparison result and the exponent comparison result, as well as an operand sign bit for each of the two data operands. If the exponent portions of the two data operands are not equal, the comparator logic uses an operand sign bit of each data operand and the exponent comparison result to order the two operands. If the exponent portions of the two operands are equal, the comparator logic uses the operand sign bit of each data operand and the mantissa comparison result to order the two operands.

DETAILED DESCRIPTION OF A PREFERRED EMBODIMENT

Figure 1:
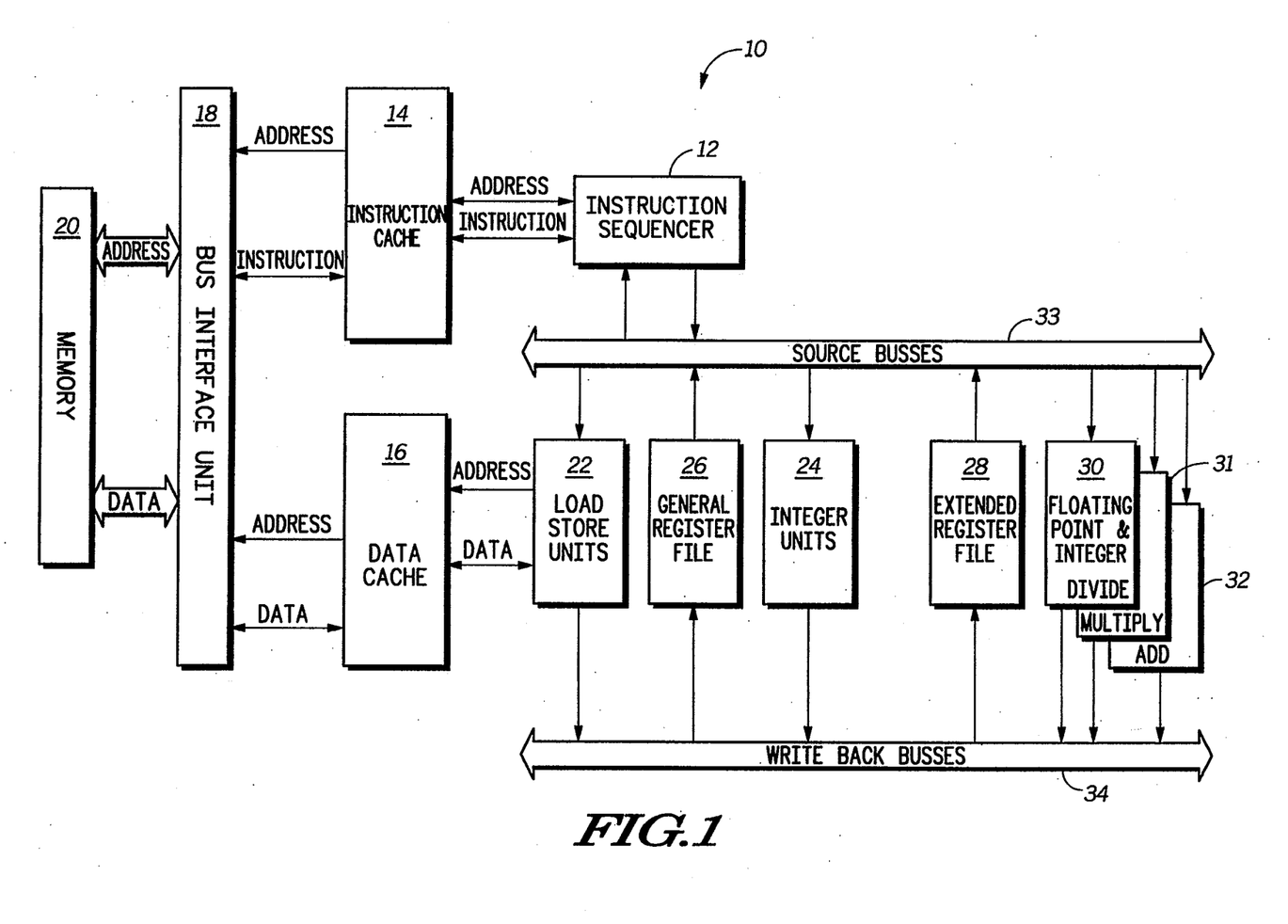
FIG. 1 illustrates, in block diagram form, a data processing system having a floating-point adder unit for performing a floating-point comparison operation in accordance with a preferred embodiment of the present invention.

Illustrated in FIG. 1 is a block diagram of an integrated circuit data processing system 10 for implementing the present invention. In a preferred embodiment, data processing system 10 includes an instruction sequencer 12, an instruction cache 14, a data cache 16, a bus interface unit 18, an external memory 20, load/store units 22, integer execution units 24, register files 26 and 28, and floating point and integer units 30-32. The instruction sequencer 12 provides control over the data flow between execution units 22, 24, 30-32, and the register files 26 and 28. Accordingly, the instruction sequencer 12 implements a 4-stage (fetch-decode-execute-writeback) master instruction pipeline, enforces data interlocks, dispatches (issues) instructions to available execution units 22, 24, and 30-32, and directs data from the register files 26 and 28 onto and off of the busses 33 and 34.

In accordance with the preferred embodiment, a large 32-word general purpose register file (GRF) 26 provides operands for integer, logical, bit-field, memory addressing, and floating-point operations. In addition, a 32-entry extended register file (XRF) 28 provides additional storage for floating point operands. The XRF 28 can hold thirty-two values of any precision (single, double, or extended). There are two writeback busses 34 available to the execution units 22, 24, and 30-32. For the purpose of simplification, the term "write-back" will be used when a particular execution unit transfers information onto one of the two buses comprising the writeback busses 34. Execution units 22, 24, and 30-32 are each independent functional units with their own internally controlled pipelines. When an execution unit finishes execution of an instruction it places the result data onto a writeback bus 34. The register files 26 and 28 take the data off the writeback busses 34 and store it into the correct destination register. If another instruction is waiting for this data, it is "forwarded" past the register files 26 and 28 directly into the appropriate function unit(s). This allows a data dependent instruction to issue on the same dock as the write-back of the previous independent instruction, without waiting for the data to be written into the register file and read back out again. Since different execution units have different pipeline lengths, it is possible for more than two instructions to be completing in a given clock cycle. Consequently, execution units 22, 24, and 30-32 arbitrate for an available slot on a writeback bus 34. The highest writeback priority is granted to single-cycle execution units, such as the integer units 24, so that single-cycle instructions are always guaranteed a writeback slot while multistage pipeline units, such as floating point units 30-32 and load/store units 22, arbitrate for writeback slots. Pipelined execution units which are denied a writeback slot, will continue to advance their internal pipeline stages and accept new instructions until all pipeline stages are full.

In the preferred embodiment, the floating-point and integer units 30-32 run concurrently with all other execution units 22 and 24 and any mix of integer, memory, and floating-point operations can be issued together in the same clock. The floating-point multiplier (MULTIPLY) 31 and adder (ADD) 32 units execute floating-point instructions in three clocks (independent of the operand precision) but are fully pipelined to allow new instructions to issue every clock. The divider unit (DIVIDE) 30 is a non-pipelined iterative SRT divider. The results produced by the floating-point units 30–32 are exact IEEE results with no software fix-up required.

Figure 2:
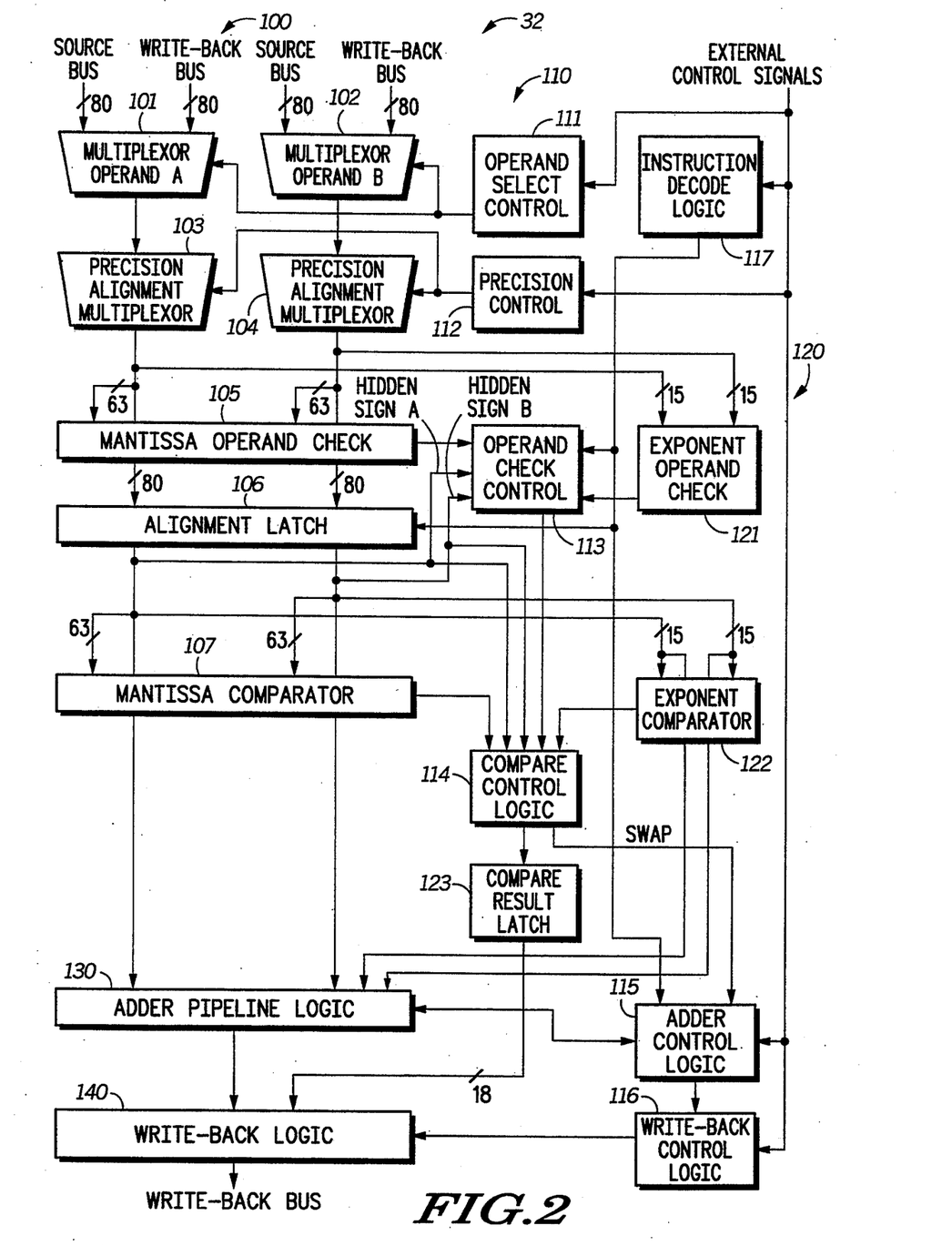
FIG. 2 illustrates, in block diagram form, a multistage floating-point adder unit, in accordance with the preferred embodiment of the present invention.

Illustrated in FIGS. 2 is a block diagram of the adder unit 32, in accordance with a preferred embodiment of the present invention. In the preferred embodiment, the adder unit 32 is a multi-stage pipeline which includes a mantissa data path portion 100, control logic portion 110, an exponent data path portion 120, and adder pipeline logic 130, and write-back logic 140. The mantissa path logic 100 of the adder unit 32 comprises operand multiplexors 101–102, operand precision alignment multiplexors 103–104, operand check logic 105, an alignment latch 106, and mantissa comparator logic 107. The control logic portion 110 comprises operand select control logic 111, precision control logic 112, operand check control logic 113, compare control logic 114, adder control logic 115, write-back control logic 116, and instruction decode logic 117. The exponent data path logic 120 comprises exponent operand check logic 121, and exponent comparator logic 122. The adder pipeline logic 130 executes a plurality of floating-point instructions (e.g. add/subtract).

In accordance with the preferred embodiment, for any given floating point instruction (e.g. add, subtract, compare), the operands (A and B) may be sourced from either the general register file 26 or the extended register file 28, via the source busses 33, or the write-back busses 34. In a conventional manner, control signals from the sequencer 12 are driven to the adder unit 32 to indicate which bus 33 or 34 will provide the source operands (A and B). The instruction decode logic 117 receives the control signals from the sequencer 12, and provides various adder control signals to the adder control logic 115, in addition to providing the control signal for the alignment latch 106. Upon completion of the floating-point instruction, the write-back logic 140 transfers the computed result to either register file 26 or 28, via the write-back busses 34.

Figure 4:
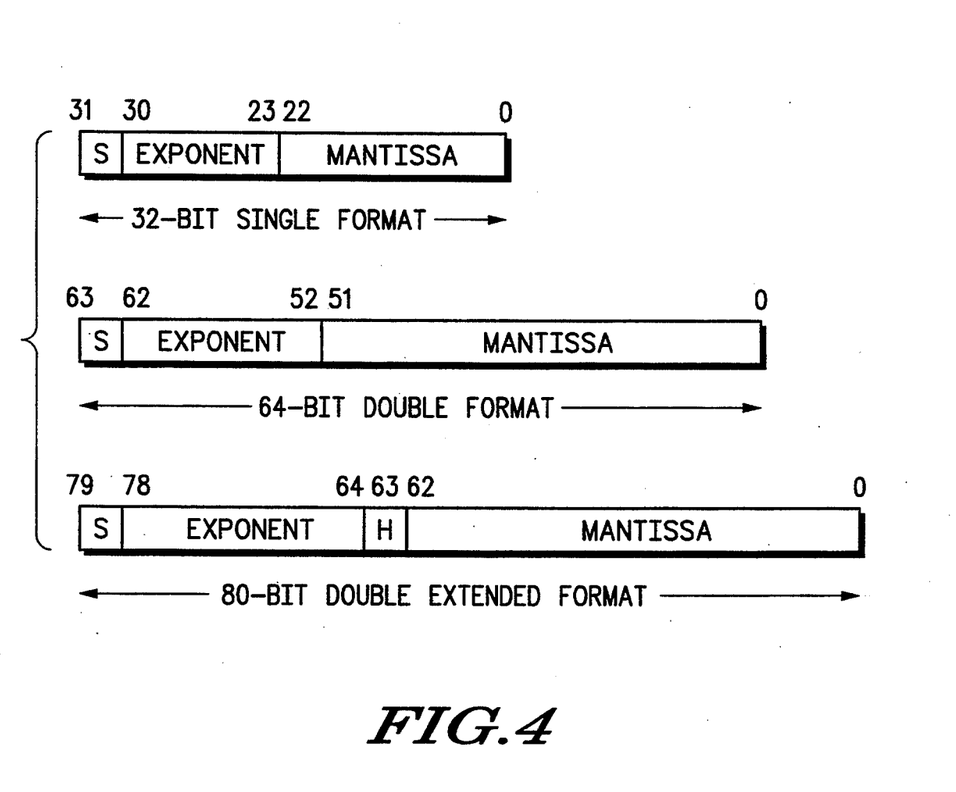
FIG. 4 illustrates the floating-point data formats used by the floating-point adder unit of FIG. 2, in accordance with the preferred embodiment of the present invention.

Depending upon the type of instruction being executed by the adder unit 32, the operands may be integers, or floating point numbers of single, double or extended precision, represented in the IEEE floating-point format, as illustrated in FIG. 4. In the preferred embodiment, all operands are driven onto the source busses 33 or write-back busses 34 aligned to the Sign (S) bit (which is the most significant bit (MSB) of the operands), regardless of the size or precision. Incoming exponents are de-biased by the adder unit 32 to facilitate their use. The bias amount and maximum and minimum exponent values representable by the various IEEE floating-point formats vary according to precision.

Figure 3:
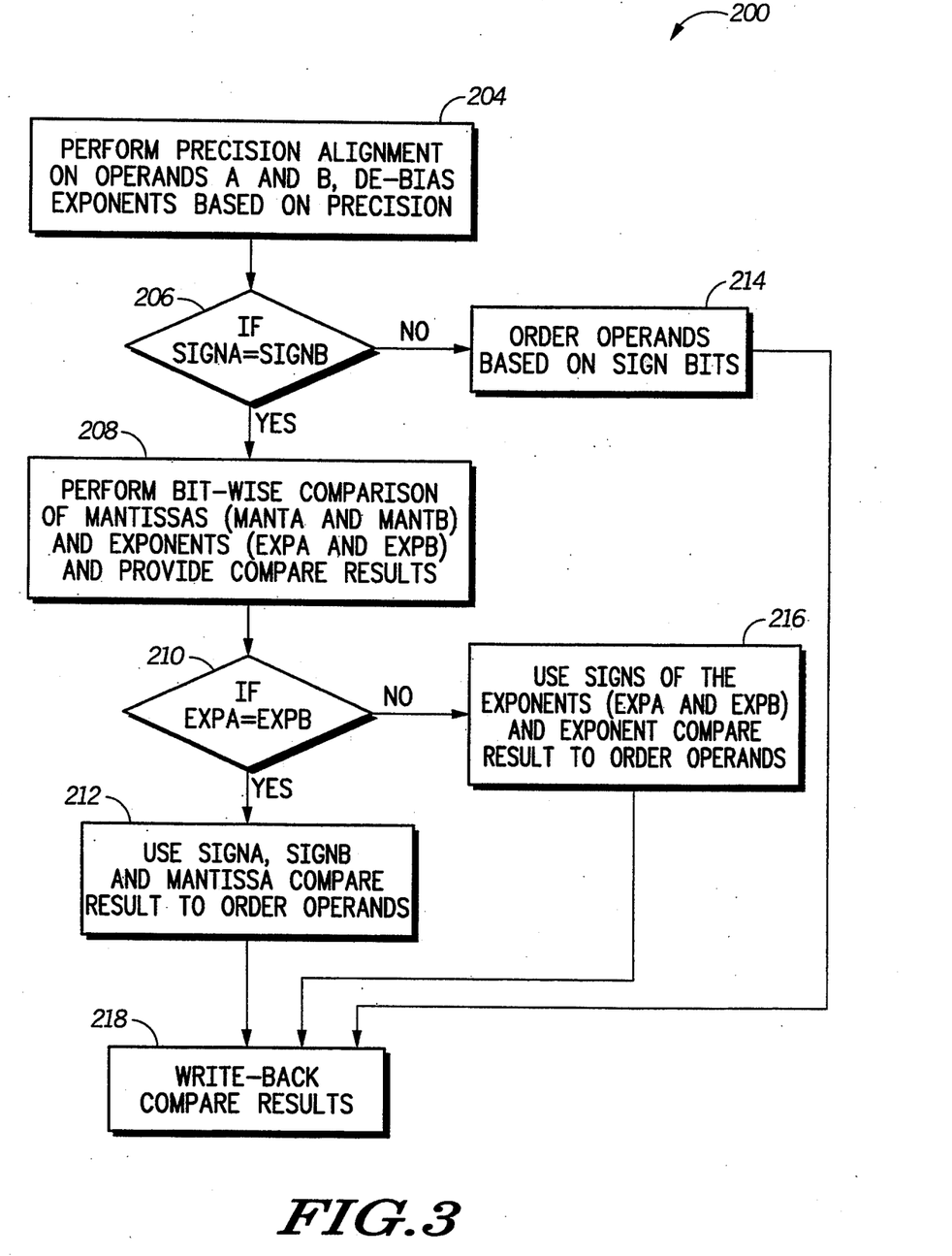
FIG. 3 illustrates a flow diagram for performing a floating-point comparison operation, in accordance with the present invention.

In the present invention, adder unit 32 executes a floating-point compare operation to order two operands A and B, as illustrated in the flow diagram 200 (FIG. 3). The mantissa path logic 100 begins by selecting the appropriate busses 33 or 34 from which to receive the incoming operands (operand A and operand B). Next, the adder unit performs a precision alignment operation to align the operands into the double extended precision format (illustrated in FIG. 4) which is used internally by the adder unit 32. During the precision alignment operation, the exponent portion of operands A and B is de-biased based upon the operand's precision. If the operands have opposite signs, then the adder unit 32 will order the operands based upon the sign values. Accordingly, if the sign bit of operand A is positive and the sign bit of operand B is negative, then the compare result is that Operand A is greater than Operand B. If operands A and B have the same sign (e.g. both operands are positive), then the adder unit 32 will perform a bit-wise comparison of the mantissa portion of Operand A with the mantissa portion Operand B, using the mantissa comparator logic 107, and provide a mantissa compare result (e.g. Mantissa A is greater than Mantissa B). Simultaneously therewith, the adder unit 32 will perform a bit-wise comparison of the two signed exponents of operands A and B, using the exponent comparator logic 122, and provide an exponent compare result. When the exponents of the two operands are not equal, the compare control logic 114 will use the sign bits of the exponents (ExpA and ExpB) and the exponent compare result to provide a final compare result which represent the ordering of the operands. In so doing, the compare control logic 114 will take into account the sign bits of the operands (SIGNA, SIGNB) when performing the ordering (e.g. if both operands are negative, the more negative operand will be ordered as less than the less negative operand). If the exponents of the two operands are equal, the compare control logic 114 will use the signs bits of the operands (SIGNA, SIGNB) and the mantissa compare result to order the operands. The final compare result is then written back, via the write-back logic 140.

Accordingly, as illustrated in FIG. 2, the operands (A and B) are retrieved from the source busses 33 or write-back busses 34, and gated in the operand multiplexors 101 and 102 under the control of the operand select logic 111. In the preferred embodiment, two instructions may be issued to different execution units 22, 24, 30–32 by the sequencer 12 on each clock, one in instruction slot zero, and the other in instruction slot one. For each instruction slot, there are two source busses 33, s1_b[0] and s2_b[0] for instruction slot zero, and s1_b[1] and s2_b[1] for instruction slot one. The source busses 33 are driven from the register files 26 and 28. Furthermore, there are two write-back busses 34, wb_b[0] and wb_b[1], which feed into the operand multiplexors 101 and 102. Thus, in the preferred embodiment, the first operand (A) may: (1) come from the source one busses, either s1_b[0] or s1_b[1] (depending upon whether the sequencer 12 issued the instruction in instruction slot zero or instruction slot one); or (2) be fed forward from the write-back bus zero (wb_b[0]); or (3) be fed forward from the write-back bus one (wb_b[1]). Similarly, the second operand (B) may: (1) come from the source two busses (either s2_b[0] or s2_b[1]); or (2) be fed forward from the write-back bus zero; or (3) be fed forward from the write-back bus one. In all cases, the operands (A and B) are driven onto the busses 33 or 34 aligned to their sign bits (MSB), regardless of the precision. Accordingly, in response to EXTERNAL CONTROL signals generated by the sequencer 12, the operand select control logic 111 provides selection signals to the multiplexors 101 and 102 to select the operands (A and B) from the appropriate source busses 33 and/or the write-back busses 34.

The adder unit 32 then performs the alignment of the operands from their various precisions (e.g. double-precision) into the 80-bit double extended precision format used internally by the adder unit 32. Under the control of the precision control logic 112, the precision multiplexors 103 and 104 align operands A and B, respectively, based on their precisions. During precision alignment, the exponent portion of the operands may be de-biased. As defined by the ANSI/IEEE STD 754-1985, each precision requires a different bias value. Thus, in the preferred embodiment, the format of the floating-point numbers arriving to the execution units 30-32 is such that all exponents are biased by some constant (depending upon the precision of the floating-point number) selected to make the biased exponent's range non-negative. One of the functions of the precision alignment operation is to de-bias the exponents to facilitate their use by the adder unit 32. One method to de-bias the exponent of a floating-point number is to subtract the bias amount for a particular precision from the biased exponent. A second method is to subtract the bias plus one from the biased exponent. In the preferred embodiment, the adder unit 32 employs the second de-biasing method resulting in the exponent ranges and bias values illustrated in Table I. The advantage of the second method is that the de-biasing process requires only the inversion of the most significant bit of the incoming biased exponent. Furthermore, the second method places negative numbers in a modified two's complement representation (i.e. a two's complemented value minus one).

TABLE I

Summary of Format Parameters and Ranges

| Parameter | Precision | | |
|---|---|---|---|
| | Single | Double | Extended |
| No. of significand bits | 24 | 53 | 64 |
| $E_{max}$ | +127 | +1023 | +16383 |
| $E_{min}$ | −126 | −1022 | −16382 |
| Exponent bias | +127 | +1023 | +16383 |
| Biased Exponent Range | $0 < e < 255$ | $0 < e < 2047$ | $0 < e < 32767$ |
| Exponent width (bits) | 8 | 11 | 15 |
| Internal format width | 32-bits | 64-bits | 80-bits |
| External format width | 32-bits | 64-bits | 96-bits | where:
e = any integer value between $E_{min}$ and $E_{max}$
$E_{min}$ = Minimum Exponent
$E_{max}$ = Maximum Exponent As illustrated in FIG. 2, after precision alignment, the mantissa portion of the operands (A and B) are checked by the mantissa operand check logic 105 for all zeros. Similarly, the exponent portion of the operands are checked, by the exponent operand check logic 121, for all zeros or all ones prior to the exponent de-biasing. In the preferred embodiment, specific combinations of exponent fields and mantissa fields may be used to represent reserved operands and special operands. A reserved operand is any de-normalized number, extended precision unnormalized number, or any value which is not-a-number (NaN). A special operand may be positive/negative zero (±0) or positive/negative infinity (±∞). Typically, these operands are defined by an exponent field of either $E_{min}-1$ or $E_{max}+1$ and a mantissa field of either all zeros or any non-zero bit pattern. Thus, in order to detect operations where one of the operands (A or B) is a reserved or special operand, the adder unit 32 performs a zero detection across the mantissa field.

The zero detection circuitry (not shown) is implemented in the mantissa operand check logic 105 with a precharged wire-OR structure. Since the incoming operands (A and B) have been converted into a double extended precision format, the zero detection is done across 63-bits. The hidden bit position is not included in the wire-OR, but is handled separately by the operand check control logic 113. In the preferred embodiment, for single or double-precision operands, it is first necessary to determine if the incoming operand is a reserved operand or a special operand before setting the hidden bit appropriately. In the case of double extended precision operands, for some of the reserved or special operand cases, the hidden bit is a don't care. Thus, the inputs to the mantissa operand check logic 105 are the 63-bit fraction field outputs from the precision alignment multiplexors 103-104. The output of the mantissa operand check logic 105 is a signal for each of the operands A and B, indicating whether the 63-bits are all zeros or not.

The precision alignment multiplexors 103 and 104 output the two operands A and B, respectively, which are latched by the alignment latch 106. In the preferred embodiment, the alignment latch 106 is an 80-bit latch, which latches the mantissa fraction fields, the hidden bits, the 15-bit exponent fields, and the sign bits of operands A and B. The outputs of the alignment latch 106 represent the operands (A and B) in their true form. For each of the operands A and B, the alignment latch 106 outputs the 63-bit mantissa fraction field to the mantissa comparator logic 107, and the 15-bit exponent to the exponent comparator 122.

In accordance with the present invention, the adder unit 32 uses the mantissa comparator logic 107 to order the mantissas of operands A and B, MantA and MantB, respectively. Simultaneously, the adder unit 32 uses the exponent comparator logic 122 to order the two exponents, ExpA and ExpB, respectively. The mantissa comparator logic 107 performs a mantissa comparison of the two 63-bit mantissa fraction fields (MantA and MantB) to thereby determine whether the mantissa of operand A is greater than (GT), less than (LT), or equal to the mantissa of operand B.

Figure 5:
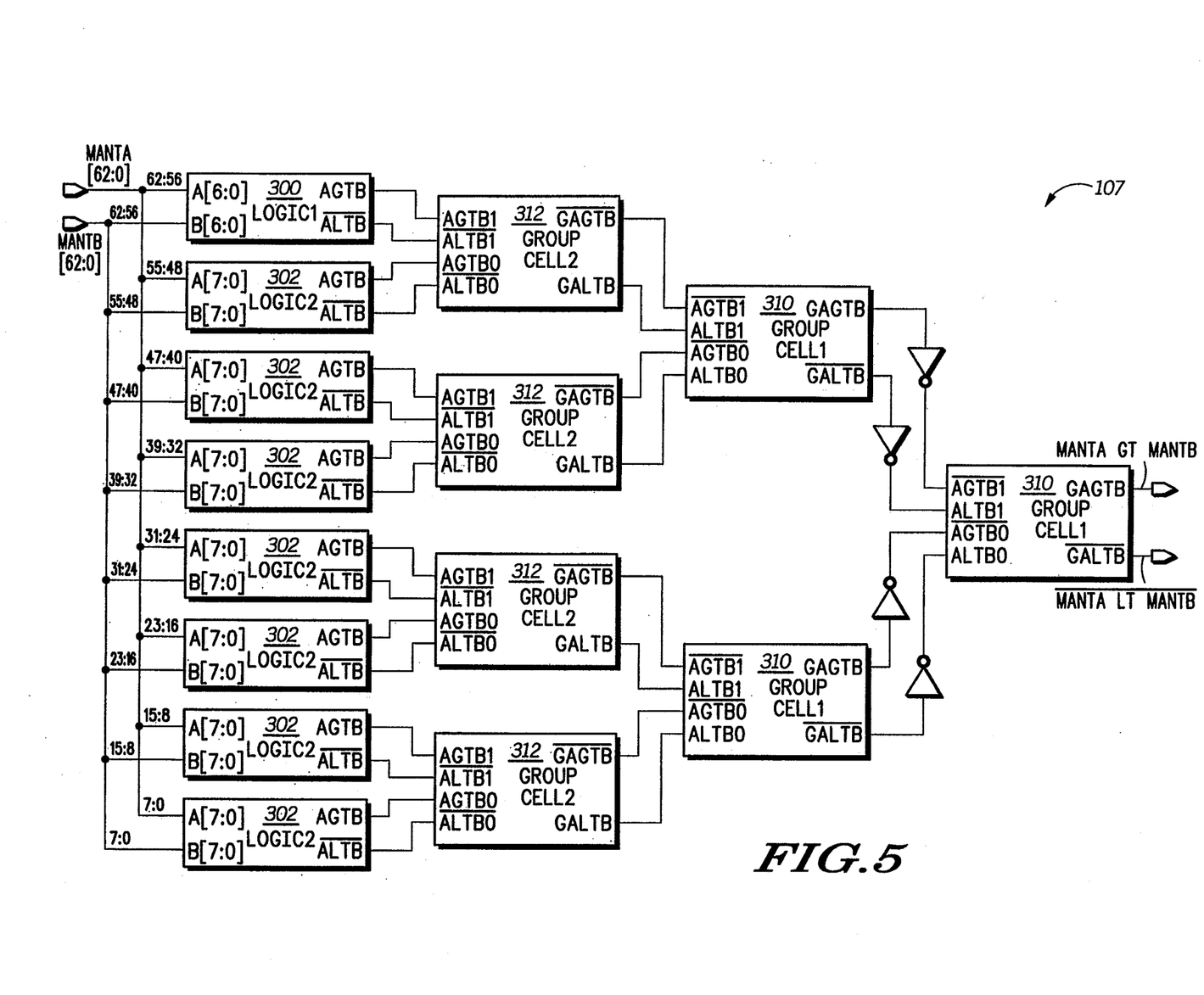
FIG. 5 illustrates, in block diagram form, a mantissa comparator for use in the floating-point adder unit of FIG. 2, in accordance with the preferred embodiment of the present invention.
Figure 6:
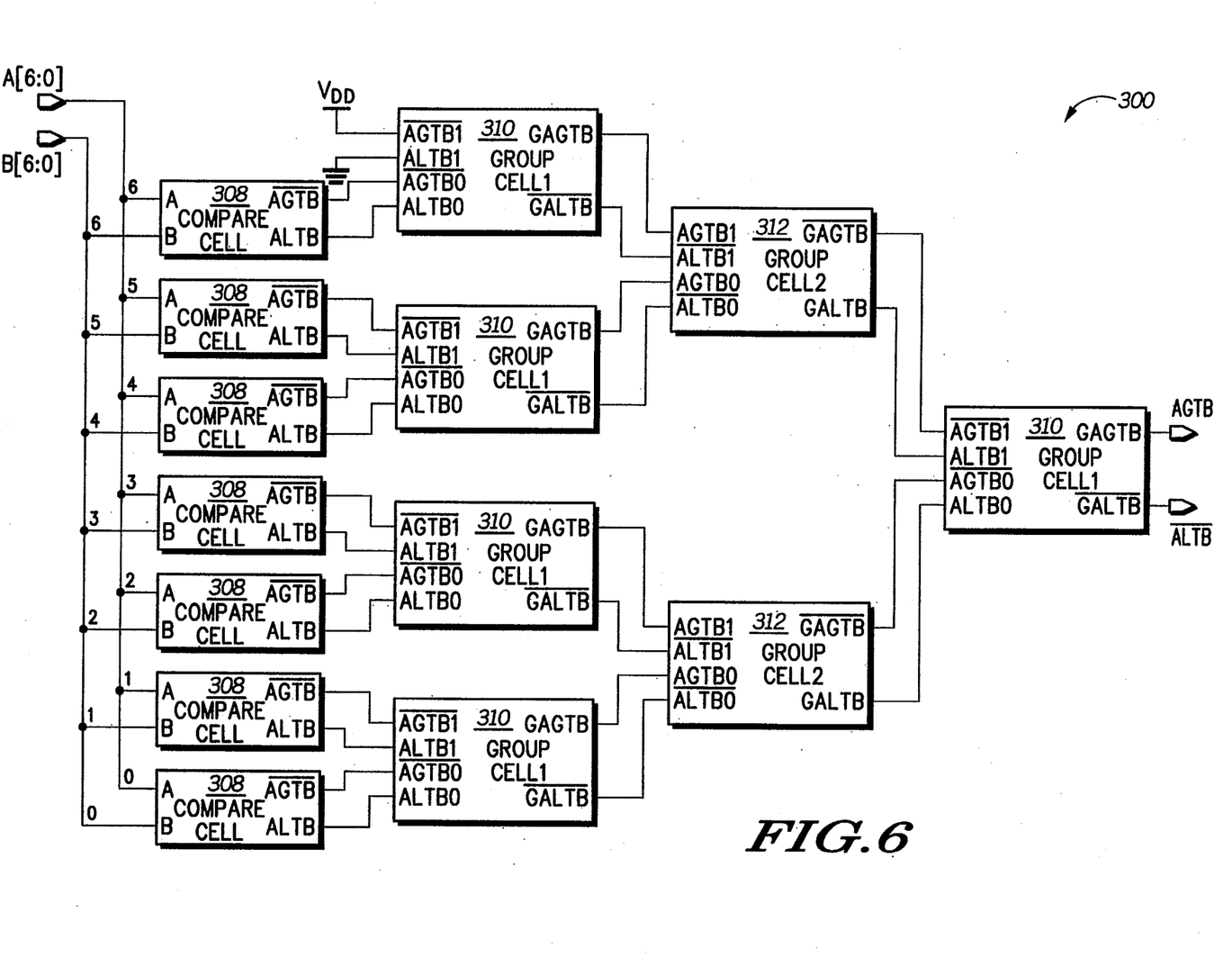
FIG. 6 illustrates, in block diagram form, a seven-bit comparator portion of a first level of the mantissa comparator of FIG. 5, in accordance with a preferred embodiment of the present invention.
Figure 7:
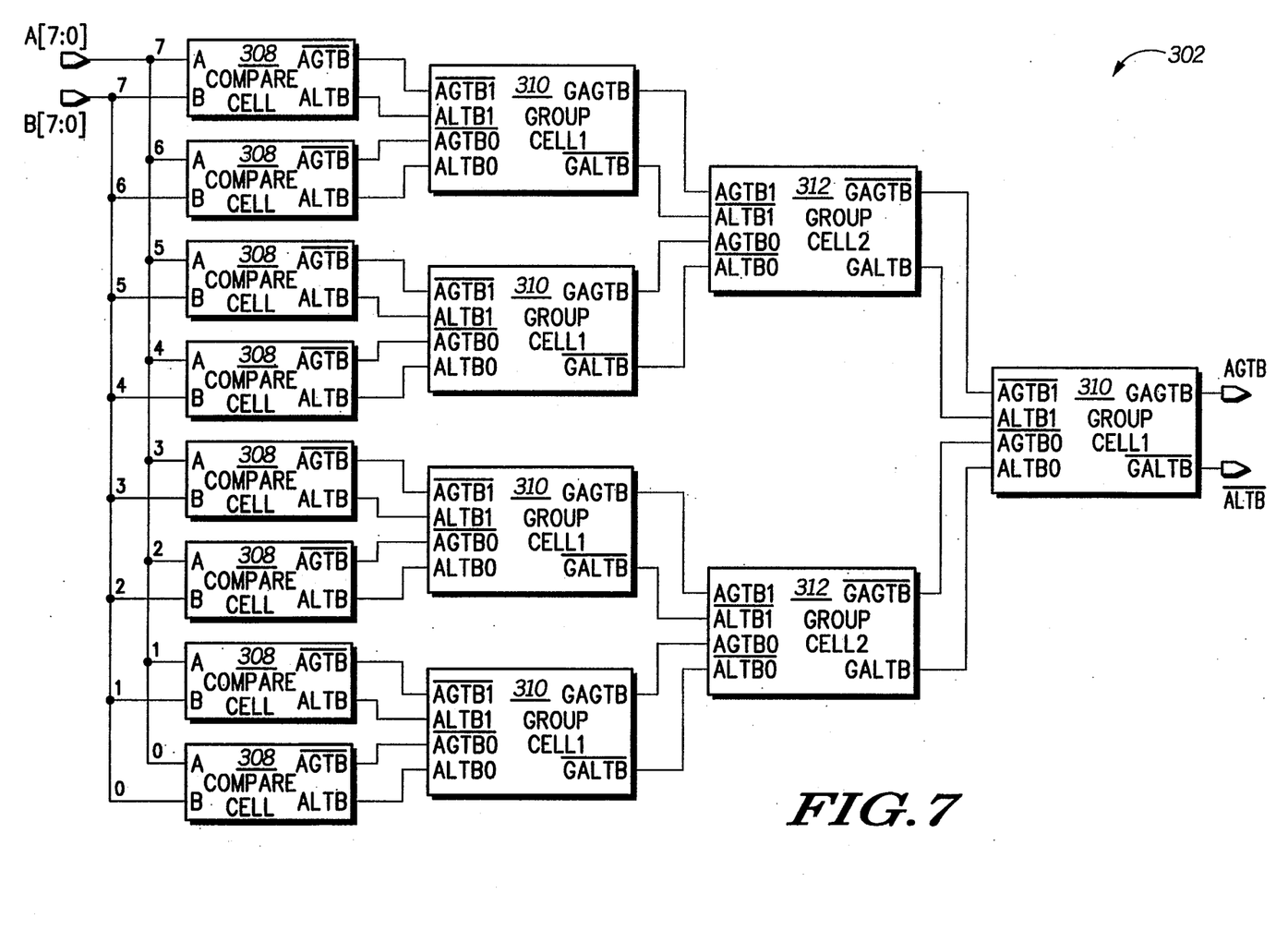
FIG. 7 illustrates, in block diagram form, an eight-bit comparator portion of the first level of the mantissa comparator of FIG. 5, in accordance with a preferred embodiment of the present invention.
Figure 8:
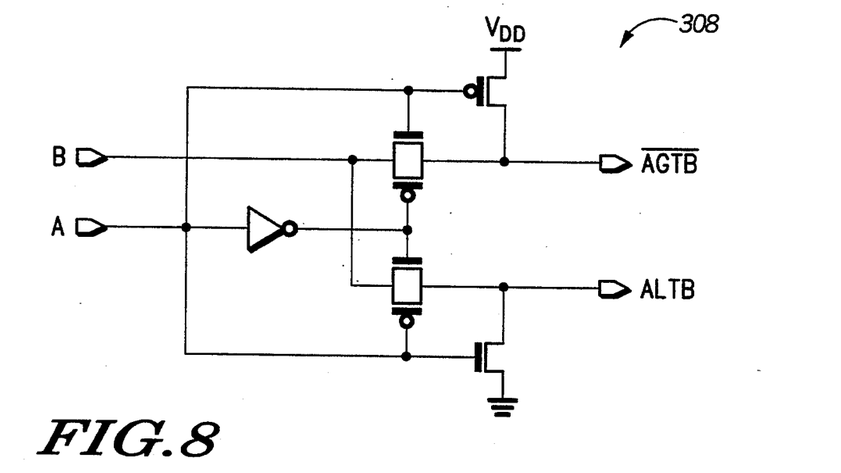
FIG. 8 illustrates, in schematic form, a bit-wise comparator circuit of the first level of the mantissa comparator of FIG. 5, in accordance with the preferred embodiment of the present invention.

Illustrated in FIG. 5 is a block diagram of the mantissa comparator logic 107 in accordance with the present invention. In the preferred embodiment, the mantissa comparator 107 is implemented in a binary tree structure which first performs a bit-wise comparison of the mantissas, then gradually builds a final compare result by grouping across two bits of the intermediate comparison results. As illustrated in FIG. 5, in the present invention, there are two levels of circuit structures, comparator LOGIC1 circuitry 300, comparator LOGIC2 circuitry 302 (hereinafter collectively referred to as "LOGIC circuitry") and GROUP CELL1 circuitry 310 and GROUP CELL2 circuitry 312 (collectively referred to as "GROUP CELL circuitry"). The comparator LOGIC circuitry 300, 302 comprises sixty-three single-bit comparators cells 308, illustrated in FIG. 8, which implement functions 1-1 and 1-2 shown below:

$$\{A \ GT \ B\}^* = A^* + B \quad \text{1-1}$$

$$\{A \ LT \ B\} = A^* B \quad \text{1-2}$$

where the "*" denotes a complementary logic value. Accordingly, if bit A is equal to bit B, then neither {A GT B}* or {A LT B} is asserted.

Figure 9:
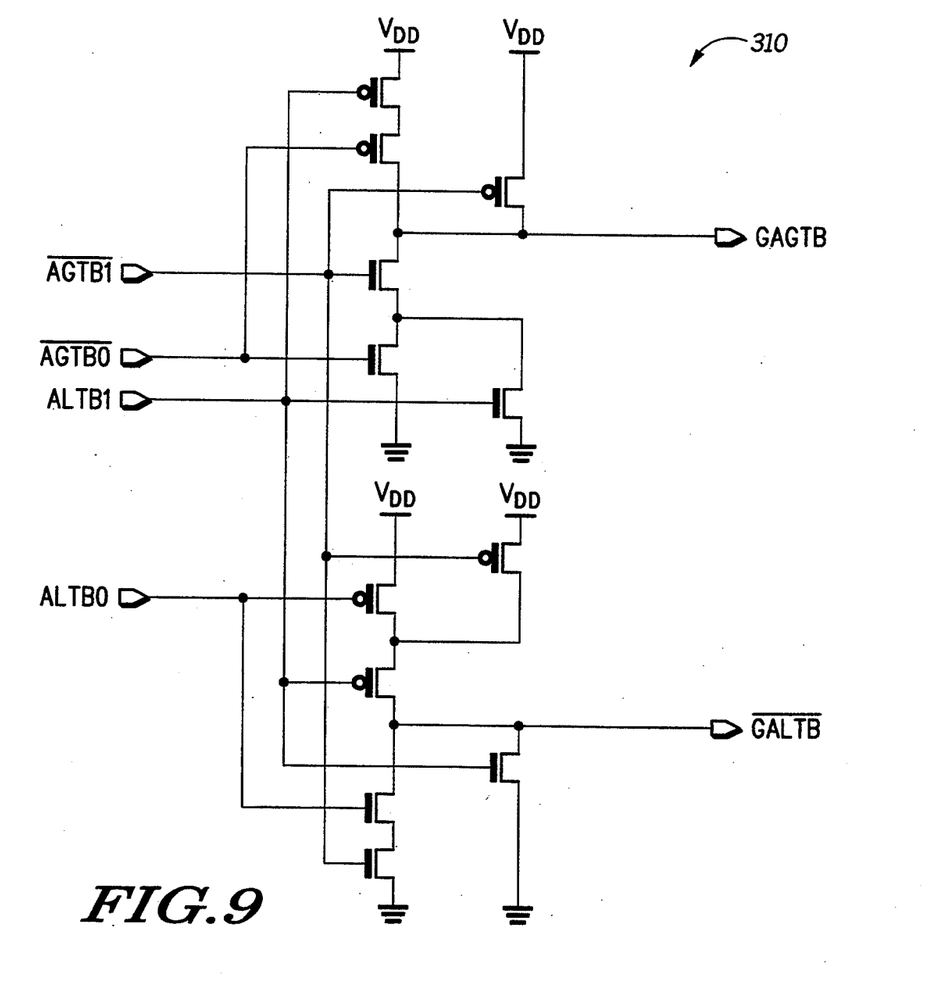
FIG. 9 illustrates, in schematic form, a first grouping cell circuit of the second level of the mantissa comparator of FIG. 5, in accordance with the preferred embodiment of the present invention.
Figure 10:
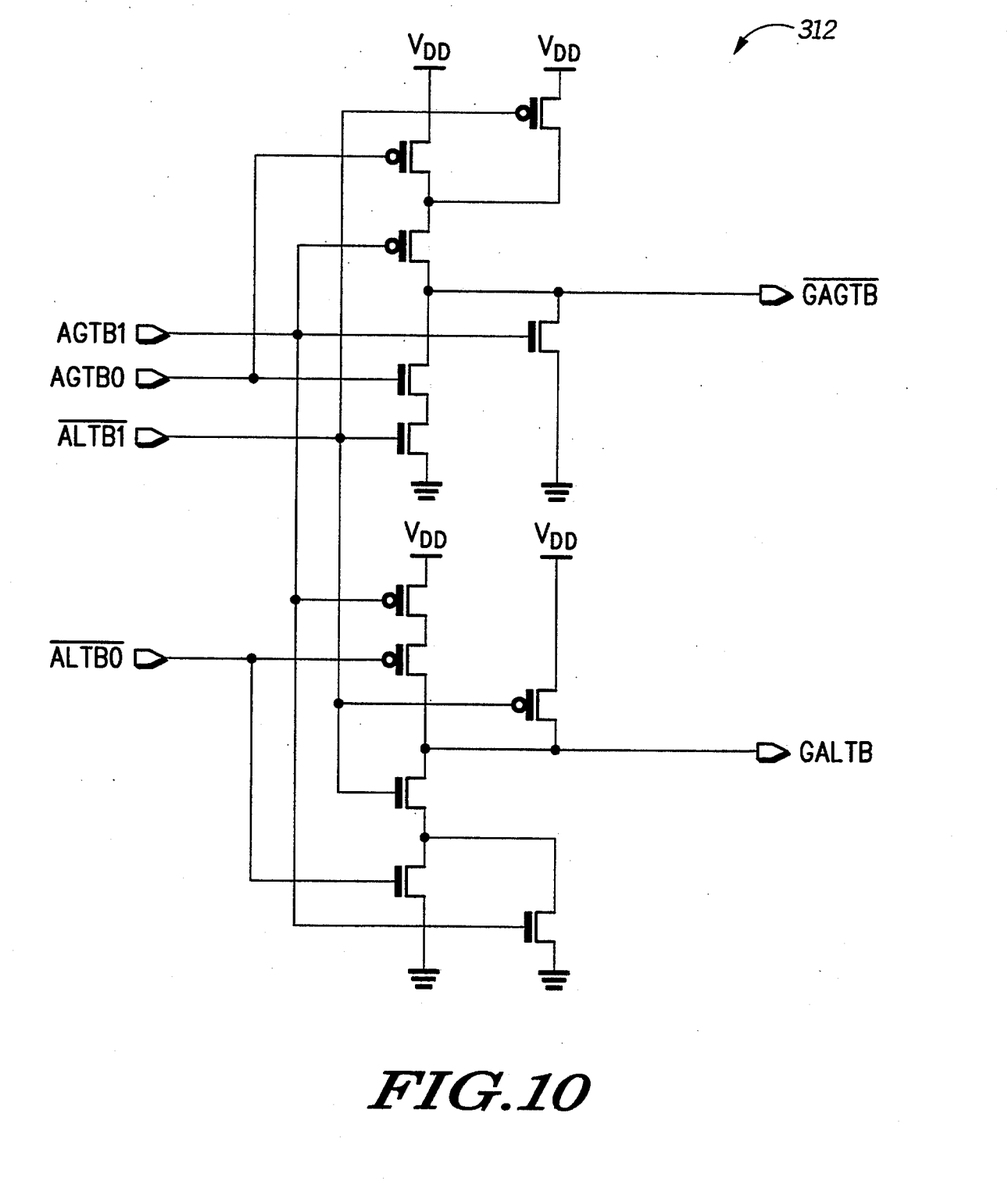
FIG. 10 illustrates, schematic form, a second grouping cell circuit of the second level of the mantissa comparator of FIG. 5, in accordance with the preferred embodiment of the present invention.

The second level of the mantissa comparator logic 107 comprises multiple stages of grouping cell circuitry 310 (FIG. 9) and 312 (FIG. 10). In the -binary tree structure of the present invention, the grouping cells 310 and 312 forms an "A less than B" (ALTB) term and an "A greater than B" (AGTB) term across N-bits. This grouping is performed by combining the results of comparison across N/2 bits. Furthermore, the higher-order bits are appropriately weighted for grouping. For example, the group A less than B term (GALTB) is active if the high-order A less than B term (ALTB1) is asserted. Alternatively, the GALTB term is active if the high-order A greater than B term (AGTB1) is not asserted and the low-order A less than B term (ALTB0) is asserted. In the present invention, the grouping cells comprise six stages. Each of the grouping cells consist of: (1) a complex gate implementing an AND-OR-invert function (AOI) with (2) a complex gate implementing an OR-AND-invert function (OAI), and the grouping stages alternate in polarity, as illustrated below. In accordance with the present invention, a first grouping structure (GROUP CELL1) 310 implements the functions shown in equations 1-3, and 1-4:

$$GAGTB = \overline{AGTB1 \cdot (\overline{AGTB0} + ALTB1)} \quad 1\text{-}3$$

$$\overline{GALTB} = ALTB1 + (\overline{ALTB0 \cdot AGTB1}) \quad 1\text{-}4$$

Similarly, the second grouping structure (GROUP CELL2) 312 implements the functions shown in equations 1-5 and 1-6:

$$\overline{GAGTB} = AGTB1 + (\overline{AGTB0} \cdot \overline{ALTB1}) \quad 1\text{-}5$$

$$GALTB = \overline{ALTB1 \cdot (\overline{ALTB0} + AGTB1)} \quad 1\text{-}6$$

In the preferred embodiment of the present invention, each level of the mantissa comparator logic 107 has only one gate delay from input to output, and the outputs from one level may be used directly in the subsequent level without inversion. In the mantissa comparator logic 107 of the present invention, there are six grouping stages. The grouping stages 310 and 312 require minimum layout area, thus, the mantissa comparator logic 107 allows maximum performance by enabling the adder unit 32 to execute a single-cycle floating-point compare instruction while minimizing the logic circuitry. Furthermore, the mantissa comparison does not require inversion of one of the mantissas in anticipation of a mantissa subtraction.

In the present invention, an exponent comparison operation is performed in parallel with the mantissa comparison operation. Accordingly, while the mantissa comparator 107 is ordering the mantissas (MantA and MantB), the exponent comparator logic 122 (FIG. 11) orders the exponents, ExpA and ExpB, of operands A and B, respectively. Using the same type of bit-wise comparator applied to the mantissas, the exponent comparator logic 122 performs a bit-wise comparison of the exponents of the floating-point operands A and B. In so doing, the exponent comparator logic 122 determines whether the exponent of one operand is greater than, less than, or equal to the exponent of the other operand. In addition, the result of the exponent comparison is used by the adder pipeline logic 130 during the performance of the mantissa alignment operation. Essentially, the mantissa alignment operation requires the operand with the smaller exponent to be shifted to align the binary points of the two operands prior to the execution of the floating-point addition or subtraction.

Figure 11:
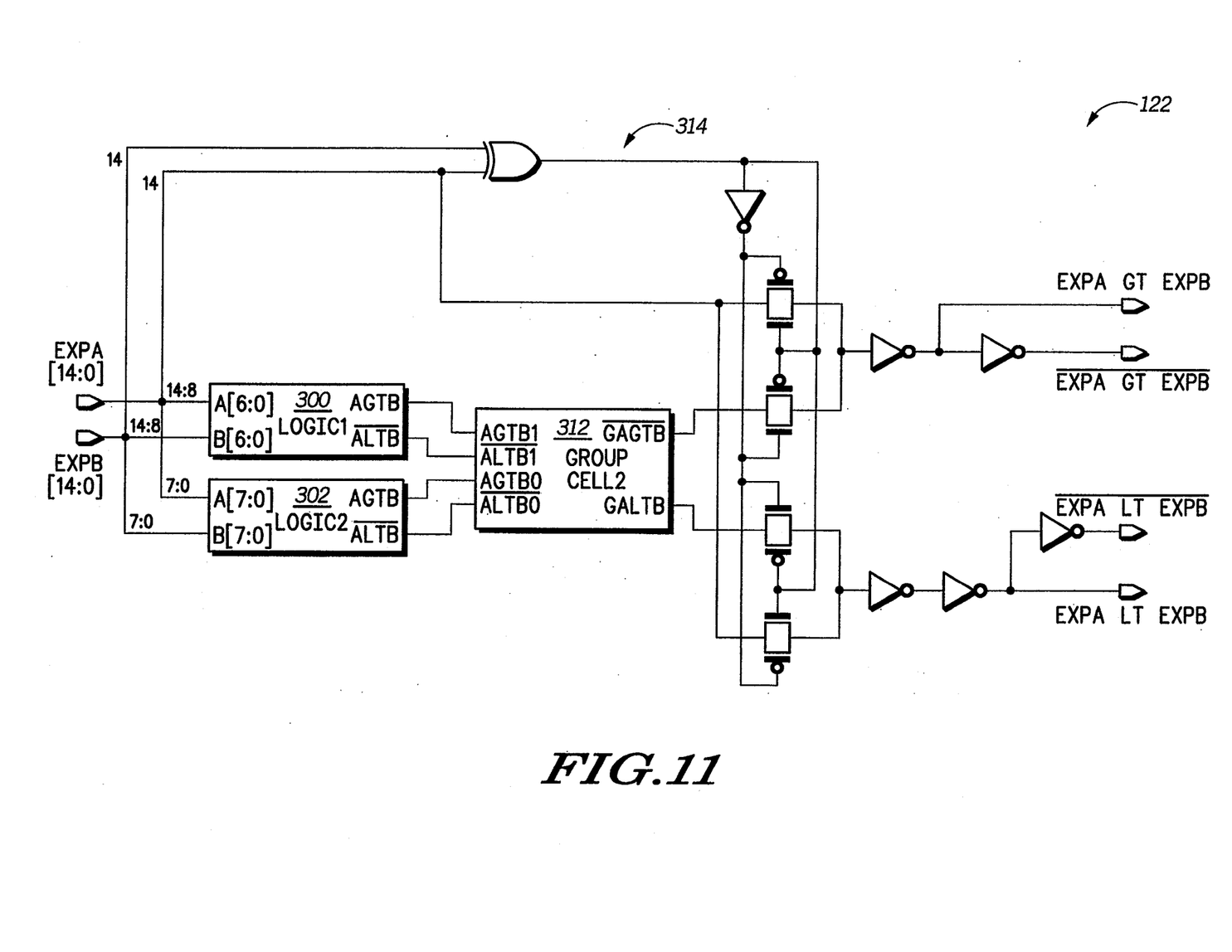
FIG. 11 illustrates, in block diagram form, an exponent comparator for use in the floating-point adder unit of FIG. 2, in accordance with the preferred embodiment of the present invention.

Illustrated in FIG. 11 is a block diagram of the exponent comparator 122 for performing an exponent comparison, in accordance with a preferred embodiment of the present invention. Since the exponent comparator 122 performs a comparison of two signed exponents, the exponent comparison of the floating-point numbers (operands A and B) requires a different consideration than the mantissa comparison operation. As defined by ANSI/IEEE 754-1985, the floating-point format for operands A and B consists of an exponent biased by a specific amount. The bias amount and the maximum and minimum exponent values ($E_{max}$ and $E_{min}$) representable by the format vary according to precision, as illustrated in Table I. In the preferred embodiment, the incoming exponents of operands A and B are debiased during precision alignment to facilitate their use. After de-biasing the exponent comparator 122 performs a comparison of the two signed exponents (ExpA and ExpB). If both exponents are negative, or if both exponents are positive, then the relative ordering of the binary representations follows the ordering of the actual exponents, and the output of the magnitude exponent comparator 122 will provide correct values for ExpA less than ExpB or ExpA greater than ExpB. If, however, one of the exponents is negative and one is positive (as determined by the most-significant bit of the internal representation), then the output of the magnitude exponent comparator 122 will be incorrect. In this case, however, the relative ordering of the two exponents (ExpA and ExpB) is implied by the sign bits of the exponents. Thus, exponent comparator 122 is a bit-wise comparator with the same structure as the mantissa comparator 107 (FIG. 5); however, the exponent comparator 122 (FIG. 11) has an additional final stage 314 to select the output of the bit-wise comparison or one of the exponent's sign bits (depending upon whether the incoming exponent signs are identical or not), as the exponent compare result.

In the preferred embodiment, the exponent comparator 122 and the mantissa comparator 107 provide their respective compare results to the compare control logic 114. In the present invention, the compare control logic 114 uses the compare results and the sign bits to determine the ordering of operands A and B, in accordance with the flow diagram 200 (FIG. 3). Accordingly, the compare control logic 114 receives the sign bits (SIGNA and SIGNB) from the alignment latch 106, and determines whether to order the operands A and B based solely on their respective signs. If the signs of the two operands are the same (SIGNA=SIGNB), the compare control logic 114 examines the output of the exponent comparator to see if one exponent is greater than the other, and then orders the floating-point operands accordingly. When the exponents are equal in magnitude, the compare control logic 114 uses the output of the mantissa comparator to determine the ordering of the operands. Accordingly, the compare control logic 114 generates eighteen compare bits to provide the full suite of condition codes or predicates as suggested by the IEEE 754-1985 standard. In generating the eighteen compare bits, the compare control logic 114 also uses control signals generated by the operand check logic 113 for detecting the reserved operands.

Thus, in the present invention, the compare control logic 114 produces an 18-bit final compare result, sixteen bits of which is directly related to the floating point comparison operation. The final compare result is latched by the compare result latch 123. The final compare result is then written back to the register files 26, 28 via the write-back logic 140. In the present invention, the floating-point comparison executes in a single machine cycle. Since the floating-point comparison operation does not fie-up the adder pipeline logic 130, the results of an addition or subtraction operation may be available at the same time as the final compare result. In such instances, the adder unit 32 performs a write-back of the add/subtract result using one of the write-back busses 34 (e.g. wb_b[0]), at the same time that the final compare result is written back using the other write-back bus (e.g. wb_b[1]). In the preferred embodiment, the order of the write-back of the final compare result is governed by the arbitration logic in the sequencer 12.

In accordance with the present invention, adder unit 32 performs a floating-point comparison of two floating-point operands by performing a bit-wise comparison of their exponents, in parallel with the performance of a bit-wise comparison of the operand's mantissas. The adder unit 32 uses a fast binary tree structure, mantissa comparator logic 107, to determine whether the mantissa of operand A is greater than or less than the mantissa of operand B. In a similar manner, the adder unit 32 uses a modified version of the binary tree structure, exponent comparator logic 122, to determine whether the exponent of operand A is greater than or less than the exponent of operand B. If the result of the comparison indicates that the two exponents (ExpA and ExpB) are not equal, the adder unit 32 uses the signs of the operands (SIGNA, SIGNB) along with the exponent comparison results (generated by the exponent comparator 122) to order the the floating-point operands. If the exponents are equal, then the adder unit 32 uses the signs of the operands (SIGNA, SIGNB) along with the mantissa comparison results (generated by the mantissa comparator 107) to order the two floating-point operands.

In the present invention, the structure of the bit-wise comparison logic 107, 122 allows for a smaller layout area and a faster comparison than the conventional subtractor/zero-detect circuitry employed in the prior art. The simplicity of the comparator logic 107, 112 facilitates its easy integration into an execution unit such as adder 32. Furthermore, the performance of a mantissa comparison using the present invention does not require an inversion of one of the mantissas (to form the two's complement value), in anticipation of the subtraction operation, as required by the prior art comparison methods. Accordingly, the mantissa comparator logic 107 increases the performance of a floating-point addition/subtraction operation by determining operand ordering before the operand alignment and subtraction occurs. As such, the adder pipeline logic 130 will produce only true positive magnitude results, thereby eliminating the requirement for a two's complementation of an intermediate adder result before write-back.

While the present invention has been described in accordance with a preferred embodiment, it should be apparent to one of skill in the art that the invention may be practiced in numerous ways. For example, in the illustrated form, the bit-wise comparison is performed on both the mantissa and exponent portions of the floating-point operands. In view of the fact that the mantissa portion of the operand is considerably larger (i.e. 63-bits) than the exponent portion (i.e. 15-bits) it may be desirable to perform the bit-wise comparison on the mantissa portion only. In such an instance, the exponent comparison could be performed in a conventional manner, using a subtractor. Using this approach would not significantly impact the time required to execute the floating-point comparison operation. Similarly, if the exponent comparison is performed on a biased exponent field, then the exponent field may be treated as an unsigned value similar to the mantissa field. Accordingly, it is intended by the appended claims to cover all modifications of the invention which fall within the true spirit and scope o the invention.

We claim:

1. In a data processor having an execution unit for executing a plurality of floating-point operations using a plurality of data operands, each of said data operands having a mantissa portion and an exponent portion, a method for performing a floating-point comparison operation to determine an ordering of a first data operand and a second data operand, said method comprising the steps of:

performing a first bit-wise comparison of said exponent portion of said first data operand with said exponent portion of said second data operand, to determine an exponent comparison result while simultaneously performing a second bit-wise comparison of said mantissa portion of said first data operand with said mantissa portion of said second data operand to determine a mantissa comparison result;

using an operand sign bit of each of said first data operand and said second data operand and said exponent comparison result to order said first data operand and said second data operand if said exponent portions of said first data operand and said second data operand are not equal; and using said operand sign bit of each of said first data operand and said second data operand and said mantissa comparison result to order said first data operand and said second data operand if said exponent portions of said first data operand and said second data operand are equal.

2. The method of claim 1 further comprising the step of aligning said first data operand and said second data operand into a predetermined data format based upon a precision of said first data operand and said second data operand.

3. The method of claim 1 further comprising the step of de-biasing said exponent portion of each of said first data operand and said second data operand prior to performing said first bit-wise comparison of said exponent portion of said first data operand with said second data operand.

4. In a data processor having an execution unit for executing a plurality of floating-point operations using a plurality of data operands, each of said data operands having a mantissa portion and an exponent portion, a method for performing a floating-point comparison operation to determine an ordering of a first data operand and a second data operand, said method comprising the steps of:

aligning said first data operand and said second data operand into a predetermined data format based upon a precision of said first data operand and said second data operand;

performing a first bit-wise comparison of said exponent portion of said first data operand with said exponent portion of said second data operand and examining an exponent sign bit contained in said exponent portion of each of said first data operand and said second data operand to determine an exponent comparison result;

simultaneously performing a second bit-wise comparison of said mantissa portion of said first data operand with said mantissa portion of said second data operand to determine a mantissa comparison result;

using an operand sign bit of each of said first data operand and said second data operand and said exponent comparison result to order said first data operand and said second data operand if said exponent portions of said first data operand and said second data operand are not equal; and using said operand sign bit of each of said first data operand and said second data operand and said mantissa comparison result to order said first data operand and said second data operand if said exponent portions of said first data operand and said second data operand are equal.

5. The method of claim 4 further comprising the step of examining an operand sign bit of each of said first data operand and said second data operand to determine whether such operand sign bit for said first data operand is identical in logic value to said operand sign bit of said second data operand.

6. The method of claim 4 further comprising the step of de-biasing said exponent portion of each of said first data operand and said second data operand prior to performing said first bit-wise comparison of said exponent portion of said first data operand with said second data operand.

7. In a data processor having an execution unit for executing a plurality of floating-point instructions using a plurality of data operands, each of said data operands having a mantissa portion, an exponent portion and an operand sign bit, a method for performing a floating-point comparison operation to determine an ordering of a first data operand and a second data operand, said method comprising the steps of:

performing a bit-wise comparison of said mantissa portion of said first data operand with said mantissa portion of said second data operand, to determine whether said mantissa portion of said first data operand is greater than, less than, or equal to said mantissa portion of said second data operand, and providing a mantissa comparison result;

examining a most significant bit of said exponent portion of each of said first data operand and said second data operand;

performing a comparison of said exponent portion of said first data operand with said exponent portion of said second data operand to determine whether said exponent portion of said first data operand is greater than, less than, or equal to said exponent portion of said second data operand, and providing an exponent comparison result;

using an operand sign bit of each of said first data operand and said second data operand and said exponent comparison result to order said first data operand and said second data operand, if said exponent portion of each of said first data operand and said second data operand are not equal; and using said operand sign bit of each of said first data operand and said second data operand and said mantissa comparison result to order said first data operand and said second data operand if said exponent portion of each of said first data operand and said second data operand are equal.

8. The method of claim 7 further comprising the step of examining said operand sign bit of each of said first data operand and said second data operand to determine whether such operand sign bit for said first data operand is identical in logic value to said operand sign bit of said second data operand.

9. The method of claim 7 further comprising the step of aligning said first data operand and said second data operand into a predetermined data format based upon a precision of said first data operand and said second data operand.

10. A data processor having an execution unit for performing a floating-point comparison operation to determine an ordering of a first data operand and a second data operand, where each of said first data operand and said second data operand has a mantissa portion and an exponent portion, said execution unit comprising:

first means for performing a first bit-wise comparison of said exponent portion of said first data operand with said exponent portion of said second data operand, to determine an exponent comparison result while simultaneously performing a second bit-wise comparison of said mantissa portion of said first data operand with said mantissa portion of said second data operand to determine a mantissa comparison result;

second means coupled to said first means for receiving said exponent comparison result and said mantissa comparison result, said second means using an operand sign bit of each of said first data operand and said second data operand and said exponent comparison result to order said first data operand and said second data operand, if said exponent portions of said first data operand and said second data operand are not equal, and using said operand sign bit of each of said first data operand and said second data operand and said mantissa comparison result to order said first data operand and said second data operand if said exponent portions of said first data operand and said second data operand are equal.

11. The execution unit of claim 10 further comprising third means coupled to said first means for de-biasing said exponent portion of said first data operand and said second data operand.

12. The execution unit of claim 11 further comprising fourth means coupled to said third means for aligning said first data operand and said second data operand into a predetermined data format based upon a precision of said first data operand and said second data operand.

* * * * *